United States Patent
Barrett

(10) Patent No.: US 7,721,313 B2
(45) Date of Patent: May 18, 2010

(54) MULTI-DVR NODE COMMUNICATION

(75) Inventor: Peter T. Barrett, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 303 days.

(21) Appl. No.: 11/428,312

(22) Filed: Jun. 30, 2006

(65) Prior Publication Data

US 2008/0022332 A1    Jan. 24, 2008

(51) Int. Cl.
H04N 7/173 (2006.01)
(52) U.S. Cl. .............................. 725/89; 725/88; 725/92; 725/94
(58) Field of Classification Search .................... 725/88, 725/89, 92, 94, 114–115
See application file for complete search history.

(56) References Cited

U.S. PATENT DOCUMENTS

| | | |
|---|---|---|
| 6,922,845 B2 | 7/2005 | Yap et al. |
| 6,973,621 B2 | 12/2005 | Sie et al. |
| 2002/0040475 A1 | 4/2002 | Yap et al. |
| 2002/0141732 A1 | 10/2002 | Reese et al. |
| 2002/0184635 A1 | 12/2002 | Istvan |
| 2003/0018971 A1 | 1/2003 | McKenna, Jr. |
| 2003/0026589 A1 | 2/2003 | Barton et al. |
| 2003/0106064 A1 | 6/2003 | Plourde, Jr. |
| 2004/0003398 A1* | 1/2004 | Donian et al. .................. 725/34 |
| 2004/0068739 A1* | 4/2004 | Russ et al. ..................... 725/39 |
| 2004/0078829 A1 | 4/2004 | Patel et al. |
| 2004/0266336 A1* | 12/2004 | Patsiokas et al. ........... 455/3.04 |
| 2004/0268419 A1 | 12/2004 | Danker et al. |
| 2005/0005300 A1* | 1/2005 | Putterman et al. ............. 725/89 |
| 2005/0050578 A1* | 3/2005 | Ryal ........................... 725/143 |
| 2005/0055730 A1 | 3/2005 | Daniels |
| 2005/0114900 A1 | 5/2005 | Ladd et al. |
| 2005/0120386 A1 | 6/2005 | Stone |
| 2005/0190947 A1 | 9/2005 | Dulac |
| 2005/0216942 A1* | 9/2005 | Barton ......................... 725/97 |
| 2006/0064720 A1 | 3/2006 | Istvan et al. |
| 2006/0218620 A1* | 9/2006 | Nadarajah et al. ........... 725/151 |
| 2007/0039033 A1* | 2/2007 | Ota ............................. 725/115 |
| 2007/0058924 A1* | 3/2007 | Yeh .............................. 386/46 |

OTHER PUBLICATIONS

Clark, "Multi-Room DVR: A Multi-Faceted Solution for Cable Operators" Available at <<http://www.sciatl.com/products/customers/white-papers/G1480A_Multi-Room%20DVR.pdf>>, 4 pages.
Cranor, et al., "NED: A Network-Enabled Digital Video Recorder", available at <<http://public.research.att.com/~kobus/docs/lanman.pdf>>, 2 pages.

* cited by examiner

Primary Examiner—Christopher Kelley
Assistant Examiner—Mulugeta Mengesha
(74) Attorney, Agent, or Firm—Lee & Hayes, PLLC

(57) ABSTRACT

Multi-DVR node communication is described. In an embodiment, television-based client devices are each a node of a multi-DVR system where the nodes are implemented for communication with each other. A node status can be communicated from a node of the multi-DVR system to the television-based client devices at the respective nodes of the multi-DVR system. A node status can include a media content identifier of media content being rendered at the node of the multi-DVR system. Additionally, node status updates can be received from each of the television-based client devices at the respective nodes of the multi-DVR system such that one or more of the television-based client devices can request to playback the media content identified in a node status update.

20 Claims, 10 Drawing Sheets

MULTI-DVR NODE COMMUNICATION

BACKGROUND

A typical household may have four, five, or more, television viewing areas and/or rooms with televisions, most of which consumers expect to have television content provided by a television programming content provider. In an IP-based television (IPTV) system, a television-based client device does not include a physical tuner like a conventional television set-top box, for example. Rather the television programming content and other media content is delivered to the household as IP-based data via a communication network.

In a multi-room viewing system, a primary device typically receives the television programming and other media content as the IP-based data, and then allocates the content to the other television-based node devices of the system. The primary device manages viewing and recording conflicts for the viewing system, such as recording times and bandwidth conflicts between the various data streams that are allocated to the node devices and to viewer requested actions, such as a request to view live television, receive video on-demand, listen to an audio channel, and the like via a data stream.

The primary device of a multi-room viewing system also controls or manages the DVR (digital video recorder) functionality and utility in the overall system because the node devices do not have the same DVR functionality and utility as the primary device in the system. If the primary device of a multi-room viewing system is missing or taken out of service, the other television-based node devices of the system may be rendered unusable, or unable to manage bandwidth and media content allocation conflicts.

SUMMARY

This summary is provided to introduce simplified concepts of multi-DVR node communication which is further described below in the Detailed Description. This summary is not intended to identify essential features of the claimed subject matter, nor is it intended for use in determining the scope of the claimed subject matter.

In an embodiment of multi-DVR node communication, television-based client devices are each a node of a multi-DVR system where the nodes are implemented for communication with each other. A node status can be communicated from a node of the multi-DVR system to the television-based client devices at the respective nodes of the multi-DVR system. A node status can include a media content identifier of media content being rendered at the node of the multi-DVR system. Additionally, node status updates can be received from each of the television-based client devices at the respective nodes of the multi-DVR system such that one or more of the television-based client devices can request to playback the media content identified in a node status update. For example, media content can be recorded in a pause buffer for a television-based client device at a node of the multi-DVR system such that one or more of the other television-based client devices can request playback of the media content from the pause buffer.

In other embodiment(s) of multi-DVR node communication, a recording request to record media content can be received from a television-based client device at a node of the multi-DVR system. A determination can be made as to whether the multi-DVR system has available resources to record the media content for the television-based client device, and in an event the multi-DVR system has the available resources, the media content can be recorded at a recording node of the multi-DVR system such that the television-based client device can access and render the recorded media content from the recording node. In addition, a playback request can be received from an additional television-based client device at a node of the multi-DVR system to receive the recorded media content such that the recorded media content can be rendered at both the television-based client device and at the additional television-based client device.

BRIEF DESCRIPTION OF THE DRAWINGS

The same numbers are used throughout the drawings to reference like features and components.

DETAILED DESCRIPTION

Multi-DVR node communication is described for a multi-DVR system that includes any number of DVR nodes of the system, as well as recording node(s). The DVR nodes of the multi-DVR system each include a television-based client device, all of which communicate with each other to act and make decisions on behalf of other nodes, for the overall common good of the multi-DVR system, and based on the state of individual nodes and/or based on the state of the multi-DVR system.

Each node of the multi-DVR system can communicate a node status to the television-based client devices at the respective nodes of the multi-DVR system, and each node of the system can receive the node status updates from the other television-based client devices in the system. A content mapping system provides that any one or more of the television-based client devices at the nodes of the multi-DVR system can be mapped to the same recorded media content. A content map includes media content references to the recorded media content to associate a television-based client device with the recorded media content. The content map can also include virtual content reference(s) that are mapped to the media content reference such that an additional television-based client device can also be associated with the recorded media content via the media content reference. In addition, the content mapping system can be utilized to implement media stream transitions where a television-based client device at a node of the multi-DVR system can be transitioned from receiving media content via a live content stream to receiving the media content from a recording, such as a pause buffer, without discontinuity when rendering the media content.

While aspects of the described systems and methods for multi-DVR node communication can be implemented in any number of different computing systems, environments, television-based entertainment systems, and/or configurations, embodiments of multi-DVR node communication are described in the context of the following exemplary systems and environments.

Figure 1:
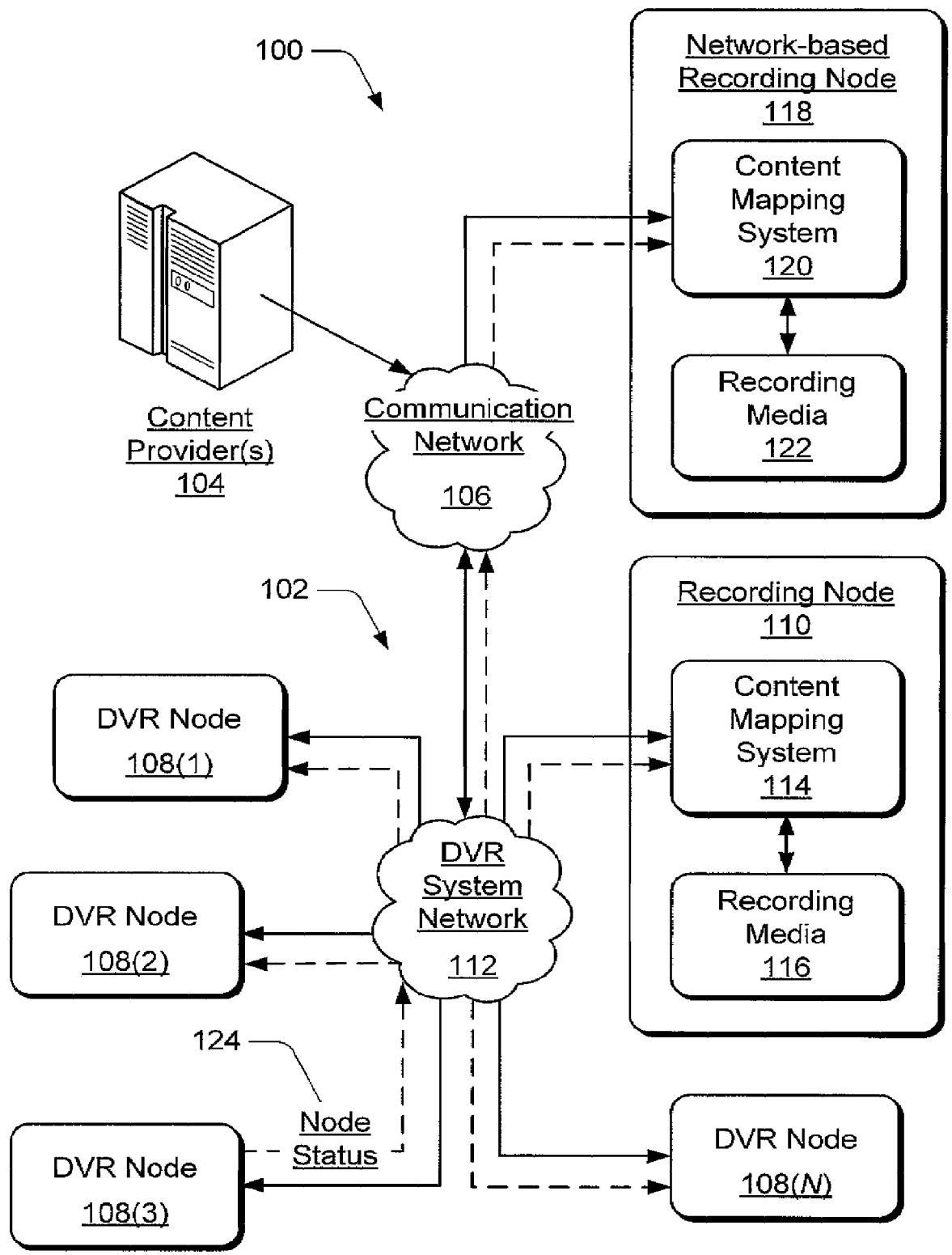
FIG. 1 illustrates an exemplary environment in which embodiments of multi-DVR node communication can be implemented.

FIG. 1 illustrates an exemplary environment 100 in which embodiments of multi-DVR node communication can be implemented. The environment 100 includes a multi-DVR system 102, such as may be implemented in a household as a viewing system that has several viewing areas, such as different rooms, for viewing television programs. An example of a multi-DVR system is described with reference to the exemplary IP-based television (IPTV) system shown in FIG. 8. The multi-DVR system 102 is configured for communication with any number of different content provider(s) 104 via a communication network 106.

Any of the systems and/or devices can be configured for network access in any number of embodiments and varieties of implementation. The communication network 106 can be implemented as any one or combination of a wide area network (e.g., the Internet), a local area network (LAN), an intranet, an IP-based network, broadcast network, a public telephone network, a wireless network, or other media content distribution network. Additionally, communication network 106 can be implemented using any type of network topology and any network communication protocol, and can be represented or otherwise implemented as a combination of two or more networks.

The multi-DVR system 102 includes DVR nodes 108(1-N) and, optionally, a recording node 110, all of which communicate with each other via a DVR system network 112. In an embodiment, the DVR nodes 108(1-N) can each be implemented to include a television-based client device and/or can be implemented as a client system as described with reference to the exemplary IP-based television (IPTV) system shown in FIG. 10. A client system can include a client device and a display device, such as any type of television, monitor, LCD, or similar television-based display system that together renders audio, video, and/or image data.

A DVR node 108 may also be implemented as any one or combination of a television-based client device, a gaming console, or as any other computing-based device, such as a desktop computer, a portable computer, a set-top box, a digital video recorder (DVR) and playback system, an appliance device, a gaming system, and/or as any other type of computing-based client device. A television-based client device at a node 108 of the multi-DVR system 102 may also be associated with a user (i.e., a person) and/or an entity that operates a client device such that the client device describes logical clients that include users, software, and/or devices.

As a television-based client device, a node 108 of the multi-DVR system 102 can be implemented with one or more processors, a communication module, memory components, and a content rendering system which can be implemented as computer executable instructions and executed by the processor(s) to implement embodiments of multi-DVR node communication. Additionally, a television-based client device at a node 108 of the multi-DVR system 102 may be implemented with any number and combination of differing components as further described below with reference to the exemplary client device shown in FIG. 9.

A television-based client device at a node 108 of the multi-DVR system 102 can receive programs, associated program content, various forms of media content, program guide data, advertising content, and other types of media content from the content provider(s) 104 via the communication network 106. Media content can include television-based programs (or programming) which may be any form of programs, commercials, music, movies, and video on-demand media content. Other media content can include recorded media content, interactive games, network-based applications, and any other similar audio, video, and/or image content. In addition, media content in general may include music streamed from a computing device to a client device, such as a television-based set-top box, and may also include video on-demand media content delivered from a server, and any other audio, video, and/or image content received from any type of media content source.

In this example, the recording node 110 of the multi-DVR system 102 includes a content mapping system 114 and recording media 116. In an embodiment, any one or more of the television-based client devices at the nodes 108(1-N) of the multi-DVR system 102 can be implemented as the recording node 110 which includes the recording media 116 to record media content received from a content provider 104. Alternatively (or in addition), a recording node of the multi-DVR system 102 can be implemented as a network-based recording node 118 that the multi-DVR system 102 communicates with via the communication network 106. The network-based recording node 118 also includes a content mapping system 120 and a recording media 122.

A recording node 110, 118 can record media content with the respective recording media 116, 122 for any one or more of the DVR nodes 108 of the multi-DVR system 102. For example, a television-based client device at a node 108 of the multi-DVR system 102 can initiate a record request to have media content recorded. A record request can be initiated for a scheduled recording or to record and provide a pause buffer for a DVR node 108 of the multi-DVR system 102. The recording node 110 can receive the record request and record the media content such that the television-based client device at the DVR node 108 can access and render the recorded media content from the recording node via the DVR system network 112. The record request from the television-based client device at the DVR node 108 of the multi-DVR system 102 can include a media content identifier of the media content, a record start time, and a record stop time such that the recording node 110 can identify the media content when received from a content provider 104 via the communication network 106.

In an embodiment, each of the nodes 108(1-N) of the multi-DVR system 102 can communicate with each other to act and make decisions on behalf of the other nodes 108(1-N), for the overall common good of the multi-DVR system 102, and based on the state of individual nodes 108 and/or based on the state of the multi-DVR system 102. The nodes 108(1-N) can communicate with each other to indicate such information as what media content a node is rendering, a bit rate of the service, an indication of whether the service is a multicast or unicast (such as a video on-demand), recording status, playback status, operational status, recording requests, and/or any other type of node-based information and requests.

Each DVR node 108 of the multi-DVR system 102 can communicate a node status 124 to all of the other DVR nodes 108(1-N) and to the recording nodes 110, 118. In an embodiment, a node status message can represent various in-band metadata sources. In this example, the node status 124 is communicated from DVR node 108(3) via the dashed lines to all of the other DVR nodes 108(1-N) and recording nodes 110, 118 via the DVR system network 112. Additionally, each DVR node 108 of the multi-DVR system 102 can receive a node status update from each of the television-based client devices at the DVR nodes 108(1-N) of the multi-DVR system 102.

Figure 2:
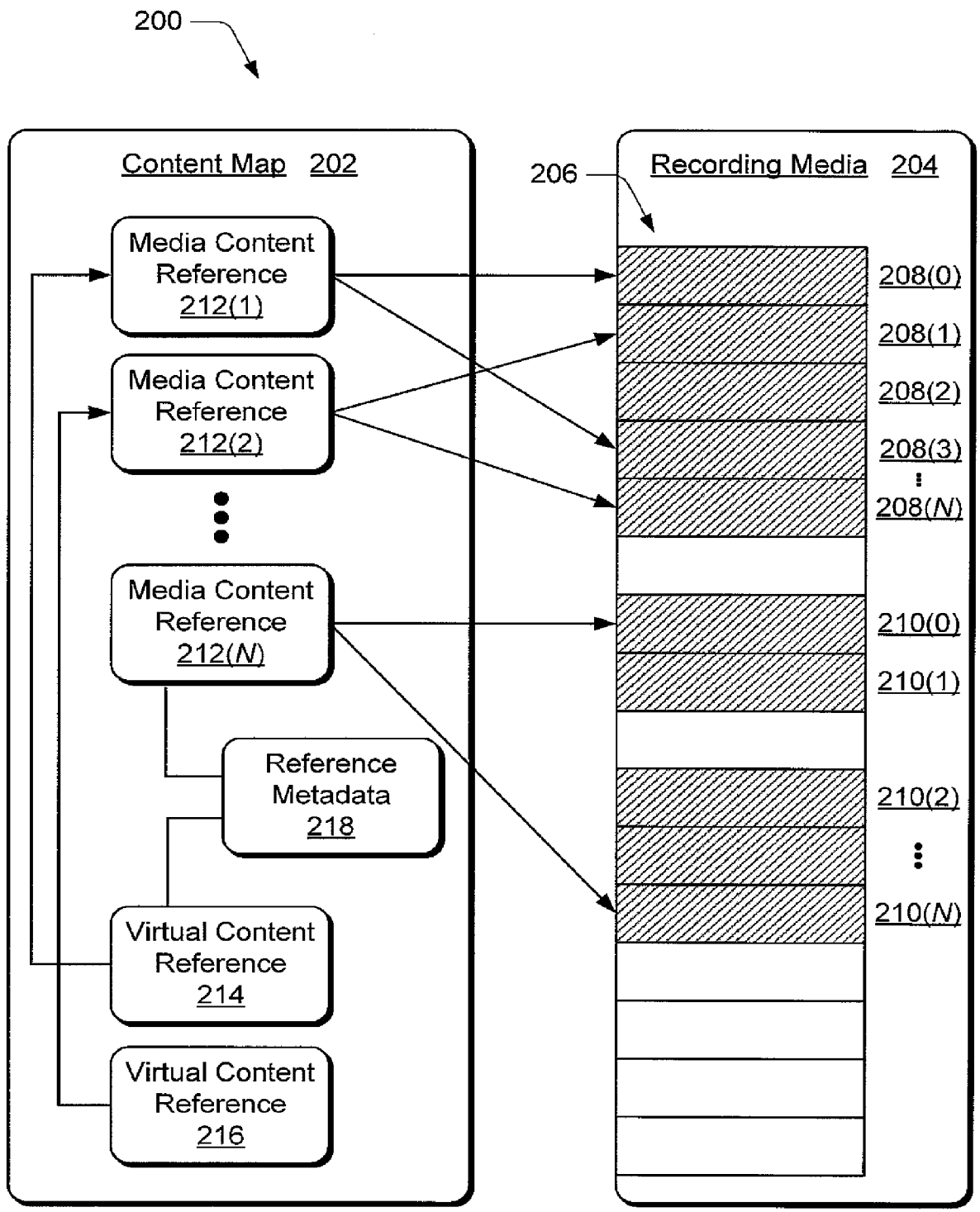
FIG. 2 illustrates an exemplary content mapping system to implement embodiments of multi-DVR node communication.

FIG. 2 illustrates an exemplary content mapping system 200 to implement embodiments of multi-DVR node communication. The content mapping system 200 can be implemented as either of the content mapping systems described with reference to FIG. 1. The content mapping system 200 includes a content map 202 and one or more recording media 204 that includes memory segments 206 (also referred to as data blocks) which are each of a size that corresponds to several minutes of video.

Media content, such as a television program, can be recorded into the memory segments 206 which are then allocated memory segments 208(0-N) that are illustrated to represent having been recorded. For example, the allocated memory segments 208(0-N) can be recorded as a scheduled recording or as a pause buffer for a television-based client device at a DVR node 108 of the multi-DVR system 102 shown in FIG. 1. Similarly, allocated memory segments 210 (0-N) are illustrated to represent having been recorded to maintain media content for a television-based client device of the multi-DVR system. Additionally, the allocated memory segments 210(0-N) illustrate that allocated memory segments do not have to be consecutive in a recording media 204.

The content map 202 includes media content references 212(1-N) that each reference to the recording media 204 to designate recorded media content that is associated with a television-based client device at a DVR node of a multi-DVR system. A media content reference may also be mapped to different overlapping recording requests, and not just to the different television-based client devices. In this example, media content reference 212(1) references to the allocated memory segments 208(0-3), media content reference 212(2) references to the overlapping allocated memory segments 208(1-N), and media content reference 212(N) references to the allocated memory segments 210(0-N).

A media content reference 212 can be implemented as a computing-based programming reference, a pointer, and/or as any other type of content mapping reference to allocated memory segments or blocks. In this example, the media content references 212(1-N) are each pointers to start and end points in the physical recording media 204 over a range of the allocated memory segments. Media content references 212 (1) and 212(2) illustrate that the media content references can be mapped to overlapping allocated memory segments of the same recording 208(0-N). As such, pause buffers for different television-based client devices can be overlapping. This provides that a viewer can tune to a channel that someone else is watching, rewind back to a previous program in that pause buffer, and select to record the program. Additionally, two different television-based client devices can be recording the same program on the same channel, such as denoted by media content reference 212(1) which references to the allocated memory segments 208(0-3) and media content reference 212 (2) which references to the allocated memory segments 208 (1-N) such that viewers at the two different television-based client devices each have a continuous viewing experience.

The content map 202 also includes virtual content references 214 and 216 which are each a reference to a media content reference 212 such that recorded media content associated with a television-based client device via the media content reference is also associated with an additional television-based client device via the virtual content reference. For example, virtual content reference 214 references to media content reference 212(1) which references to the allocated memory segments 208(0-3). Similarly, virtual content reference 216 references to media content reference 212(2) which references to the allocated memory segments 210(1-N).

Virtual content references provide for multiple references to a single recording for any number of television-based client devices. For example, a viewer at DVR node 108(1) may tune the corresponding television-based client device in the multi-DVR system 102 to receive and watch the media content associated with a particular television channel. In addition, the recording node 110 can begin recording a pause buffer for DVR node 108(1) and a media content reference 212(1) is generated to designate the recorded media content in the recording media 204 as being associated with the television-based client device. A second viewer at DVR node 108(2) may then initiate a recording of the same media content associated with the particular television channel. A virtual content reference 214 is then generated in the content map 202 which references to the media content reference 212(1) such that the second television-based client device is also associated with the recorded media content.

If the viewer at DVR node 108(1) then tunes the corresponding television-based client device to receive different media content, the recording node 110 can continue to record the media content if the television-based client device at DVR node 108(2) continues the recording. If the viewer at DVR node 108(2) stops the recording, then the recording node 110 can stop recording the media content, yet maintain the recorded media content with the recording media 204. If a viewer at yet a third DVR node 108(3) also initiates a recording of the same media content associated with the particular television channel, another virtual content reference 216 is generated which also references to the media content reference 212(1) such that the third television-based client device is also associated with the recorded media content. The virtual content references 214, 216 provide that two different DVR nodes 108 of the multi-DVR system 102 are served by the same recorded media content where the multiple content references can intersect, overlap in time, and the like.

The content map also includes reference metadata 218 which, in an embodiment, corresponds to a media content reference 212 and is associated with the recorded media content designated by the media content reference. In another embodiment, the reference metadata 218 corresponds to a virtual content reference 214 and is associated with the recorded media content designated by the virtual content reference (via a media content reference).

The reference metadata 218 that corresponds to a media content reference 212 can include a time-based index to a segment of the recorded media content where the time is an absolute time reference. The reference metadata 218 can also include attributes that are associated with the allocated memory segments, such as mapped index points from which the recorded media can be accessed and rendered, the extents or chain of allocated memory segments, a time offset within an extent, and/or any other data associated with recorded media content. The reference metadata 218 that corresponds to a virtual content reference includes attributes such as a start time and an end time of the recorded media content, and an identifier of the media content.

Figure 3:
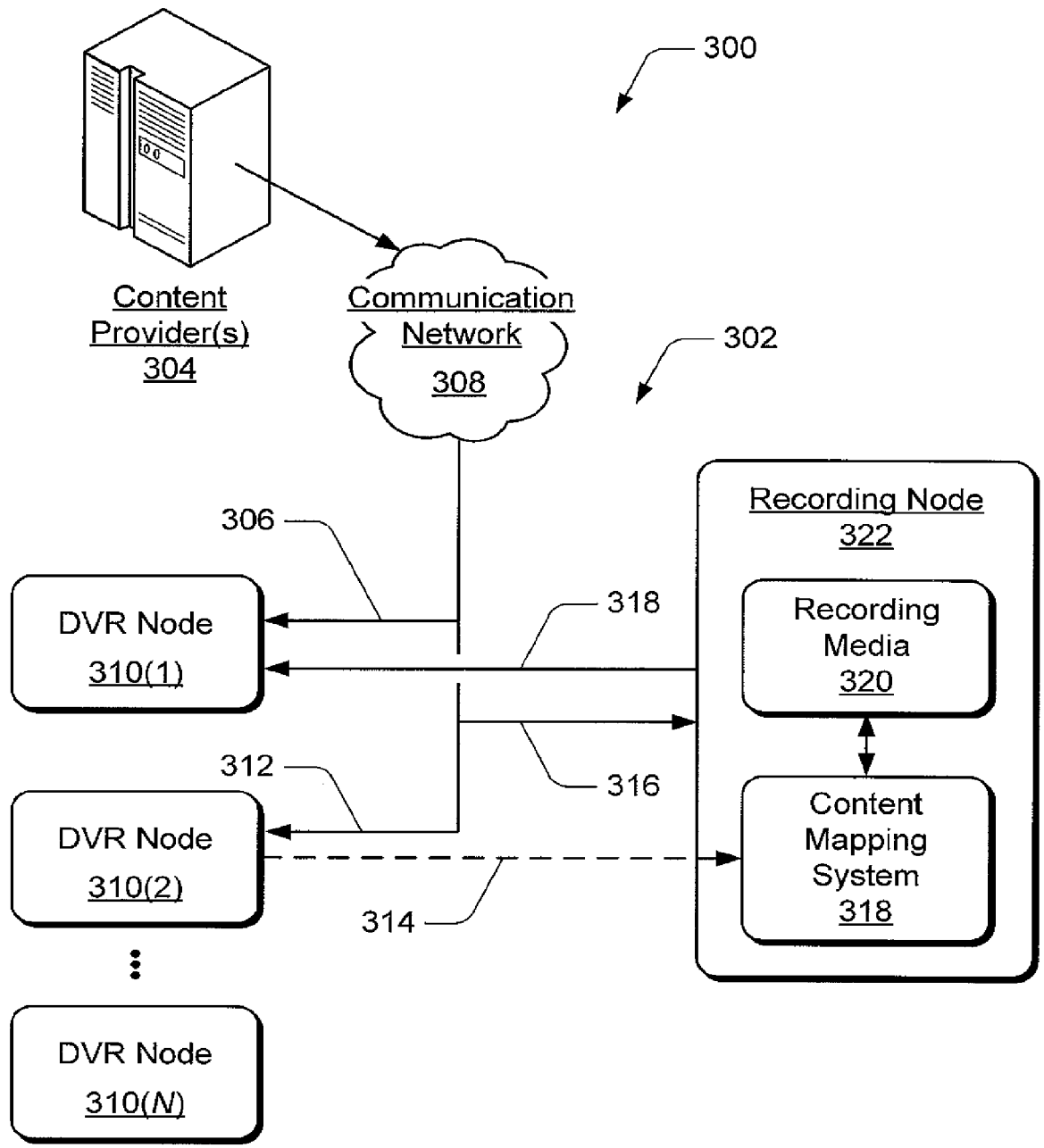
FIG. 3 illustrates an example of media transition for multi-DVR media stream transition.

FIG. 3 illustrates an example of media transition 300 for multi-DVR media stream transition in which a DVR node of a multi-DVR system 302 can seamlessly switch from a live media content stream to recorded playback. In the example media transition 300, a content provider 304 communicates a live stream of media content 306 via a communication network 308 to a DVR node 310(1) of the multi-DVR system 302. A second DVR node 310(2) of the multi-DVR system 302 can also receive the live media content stream 312, where the media content is multicast to the multi-DVR system 302. The second DVR node 310(2) can initiate 314 that the media content be recorded 316 via a content mapping system 318, such as in a pause buffer (recording media) 320 at a recording node 322 of the multi-DVR system 302.

The first DVR node 310(1) can then transition from the content stream 306 to receive the recorded media content 318 from the recording node 322 without discontinuity of the media content. In an embodiment, the content mapping system 318 can generate a media content reference to associate the recorded media content with the second DVR node 310(2) that initiates the recording. The content mapping system 318 can then generate a virtual content reference to the media content reference to also associate the recorded media content with the first DVR node 310(1). The first DVR node 310(1) can then transition from the content stream 306 to the recorded media content 318 based on a time-based index corresponding to both the media content of the content stream which is synchronous with the recorded media content.

Generally, any of the functions and methods described herein can be implemented using hardware, software, firmware (e.g., fixed logic circuitry), manual processing, or any combination thereof. A software implementation represents program code that performs specified tasks when executed on a computing-based processor. Exemplary methods 400 through 700 described with reference to respective FIGS. 4-7 may be described in the general context of computer executable instructions. Generally, computer executable instructions can include applications, routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices. Further, the features described herein are platform-independent such that the techniques may be implemented on a variety of computing platforms having a variety of processors.

Figure 4:
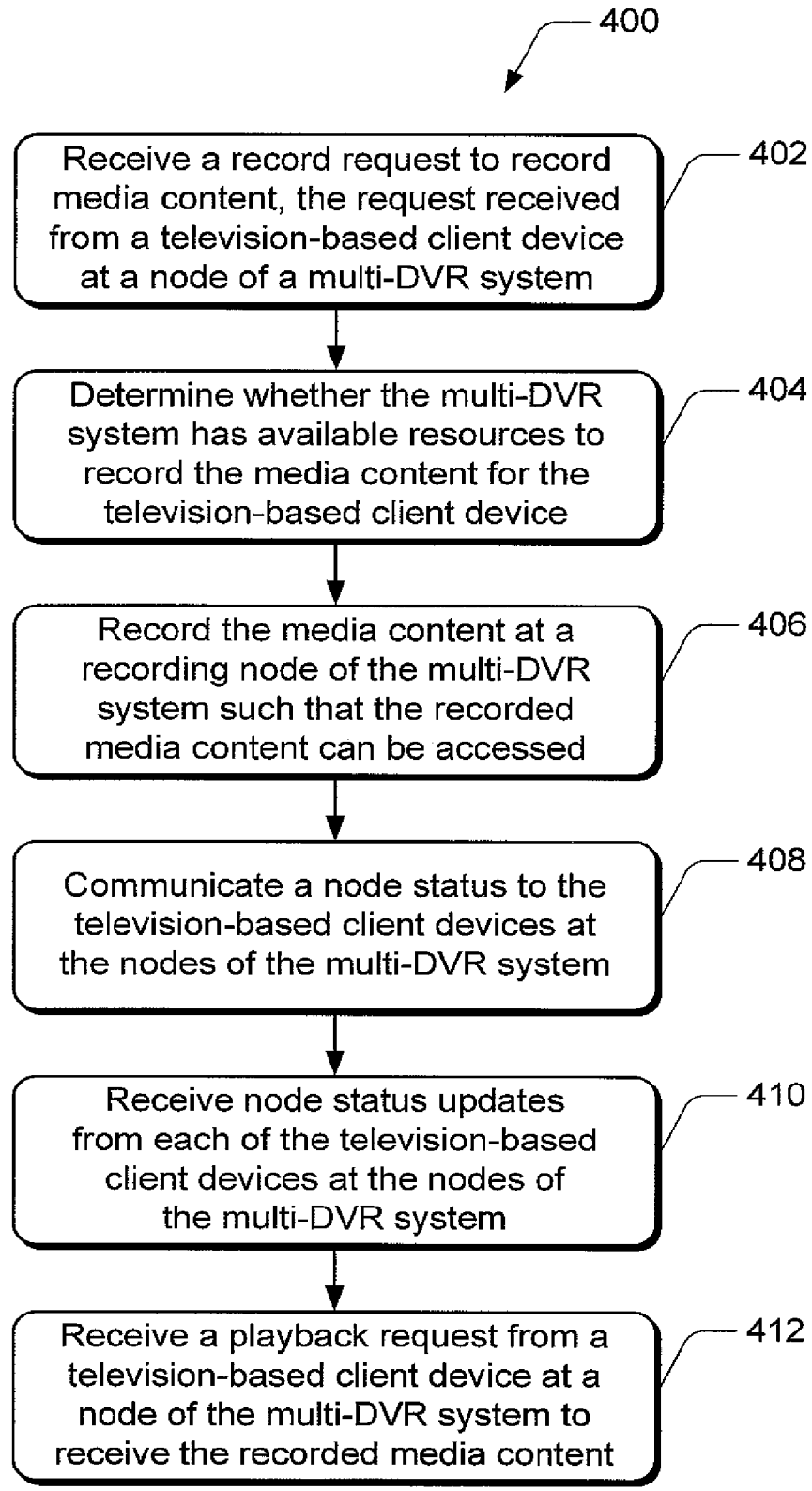
FIG. 4 illustrates exemplary method(s) for multi-DVR node communication.

FIG. 4 illustrates an exemplary method 400 for multi-DVR node communication and is described with reference to the exemplary environment shown in FIG. 1. The order in which the method is described is not intended to be construed as a limitation, and any number of the described method blocks can be combined in any order to implement the method, or an alternate method.

At block 402, a record request is received to record media content, the request being received from a television-based client device at a node of a multi-DVR system. For example, the multi-DVR system 102 includes DVR nodes 108(1-N) and a recording node 110 that can be implemented independently from the DVR nodes 108(1-N), or can be implemented as at least one of the television-based client devices at a DVR node 108. Alternative to the recording node 110, the multi-DVR system 102 communicates with recording node 118 which is a network-based service that records media content for one or more of the television-based client devices at the respective DVR nodes 108(1-N) of the multi-DVR system 102. A recording node 110, 118 receives the record request from a television-based client device where the record request includes a media content identifier of the media content to be recorded, a record start time, and a record stop time.

At block 404, a determination is made as to whether the multi-DVR system has available resources to record the media content for the television-based client device. Each of the DVR nodes 108(1-N) of the multi-DVR system 102 communicate with each other to act and make decisions on behalf of the other DVR nodes 108(1-N), for the overall common good of the multi-DVR system 102, and based on the state of individual nodes 108 and/or based on the state of the multi-DVR system 102. As such, the multi-DVR system 102 can determine whether to record the media content for the requesting television-based client device.

At block 406, the media content is recorded at a recording node of the multi-DVR system in an event the multi-DVR system has the available resources, and such that the television-based client device can access and render the recorded media content from the recording node. For example, the recording node 110 of the multi-DVR system 102 records the media content as a scheduled recording or in a pause buffer with the recording media 116 while the television-based client device is tuned to receive the media content.

At block 408, a node status is communicated to the television-based client devices at the nodes of the multi-DVR system. For example, a television-based client device at DVR node 108(3) communicates a node status 124 to all of the television-based client devices at the other nodes, and to a recording node 110 or 118 via the DVR system network 112. The node status 124 can include a media content identifier of media content being rendered by the television-based client device at DVR node 108(3).

At block 410, node status updates are received from each of the television-based client devices at the nodes of the multi-DVR system. For example, DVR node 108(1) receives node status updates (e.g., node status 124) from each of the television-based client devices at the DVR nodes 108(2-N) of the multi-DVR system 102.

At block 412, a playback request is received from a television-based client device at a node of the multi-DVR system to receive the recorded media content such that the recorded media content is rendered at both the television-based client device and at the additional television-based client device. For example, any of the television-based client devices at a DVR node 108 of the multi-DVR system 102 can request to receive the recorded media content for playback in addition to the television-based client device that initiates the record request. As such, two or more television-based client devices at different DVR nodes 108 of the multi-DVR system 102 can be served by the same recorded media content.

Figure 5:
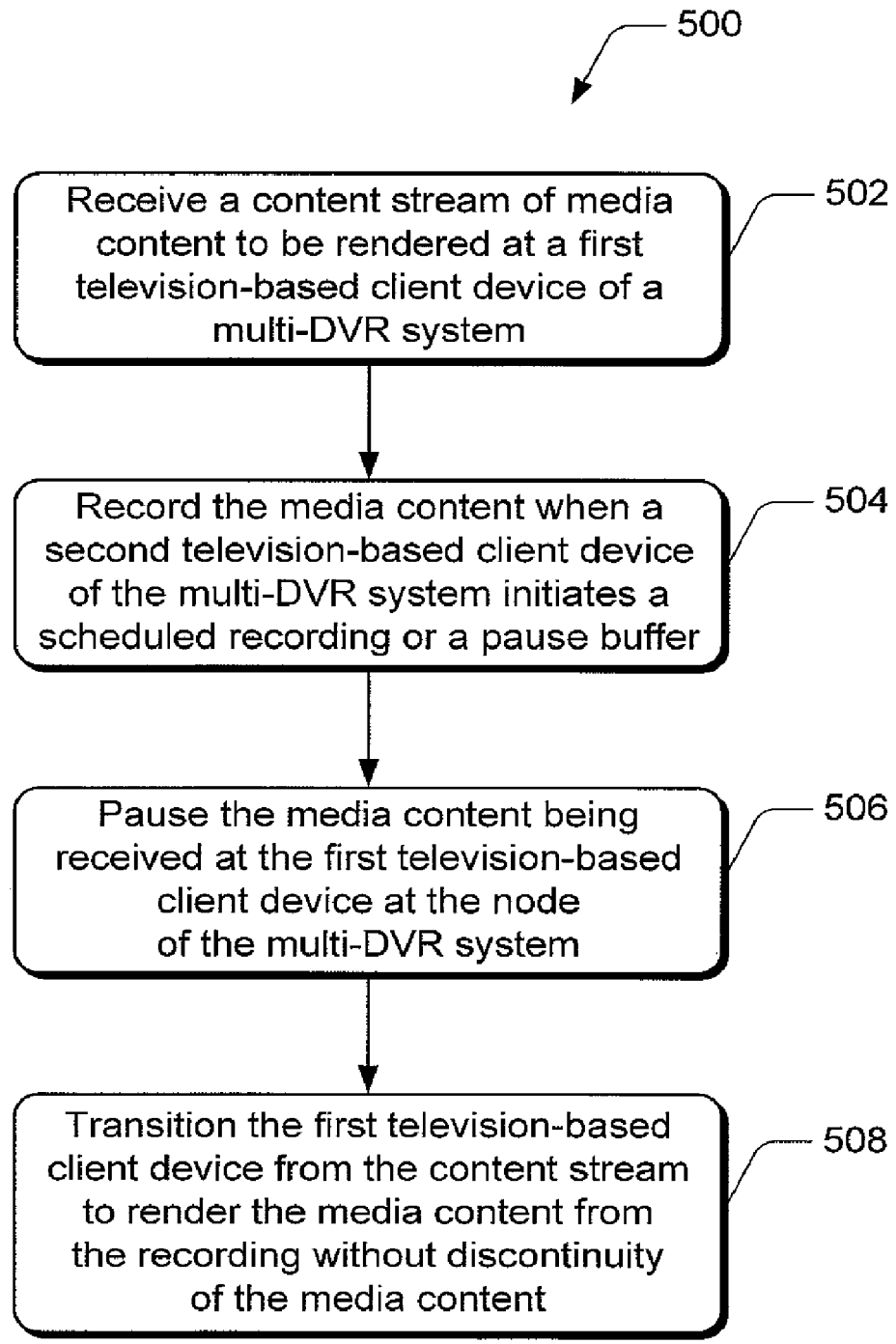
FIG. 5 illustrates exemplary method(s) for multi-DVR media stream transition.

FIG. 5 illustrates an exemplary method 500 for multi-DVR media stream transition and is described with reference to the exemplary media transition shown in FIG. 3. The order in which the method is described is not intended to be construed as a limitation, and any number of the described method blocks can be combined in any order to implement the method, or an alternate method.

At block 502, a content stream of media content is received at a first television-based client device of a multi-DVR system to render the media content. For example, the multi-DVR system 302 includes DVR nodes 310(1-N) and a recording node 322 that can be implemented independently from the DVR nodes 310(1-N), or that can be implemented as at least one of the television-based client devices to record media content for one or more of the television-based client devices at the DVR nodes 310(1-N) of the multi-DVR system 302.

The DVR node 310(1) receives a live stream of media content 306 from a content provider 304 via a communication network 308.

At block 504, the media content is recorded when a second television-based client device of the multi-DVR system initiates the recording. For example, the recording node 322 of the multi-DVR system 302 records the media content at 316 as a scheduled recording or in a pause buffer with the recording media 320 while the television-based client device is tuned to receive the media content and/or when the television-based client device initiates the recording at 314.

At block 506, the media content being received by the first television-based client device at the node of the multi-DVR system is paused. For example, a viewer at DVR node 310(1) of the multi-DVR system 302 can pause viewing the media content 306 being received from the content provider 304.

At block 508, the first television-based client device is transitioned from the content stream to render the media content from the recording without discontinuity of the media content. For example, when the television-based client device at DVR node 310(1) is resumed to continue receiving the media content, the client device is transitioned from the content stream 306 to receive the recorded media content 318 from recording node 322 without discontinuity of the media content. In an embodiment, the content mapping system 318 generates a media content reference to the recorded media content for the second DVR node 310(2) that initiates the recording. The content mapping system 318 then generates a virtual content reference to the media content reference to also associate the recorded media content with the first DVR node 310(1). The first DVR node 310(1) can then transition from the content stream 306 to the recorded media content 318 based on a time-based index corresponding to both the media content of the content stream which is synchronous with the recorded media content.

Figure 6:
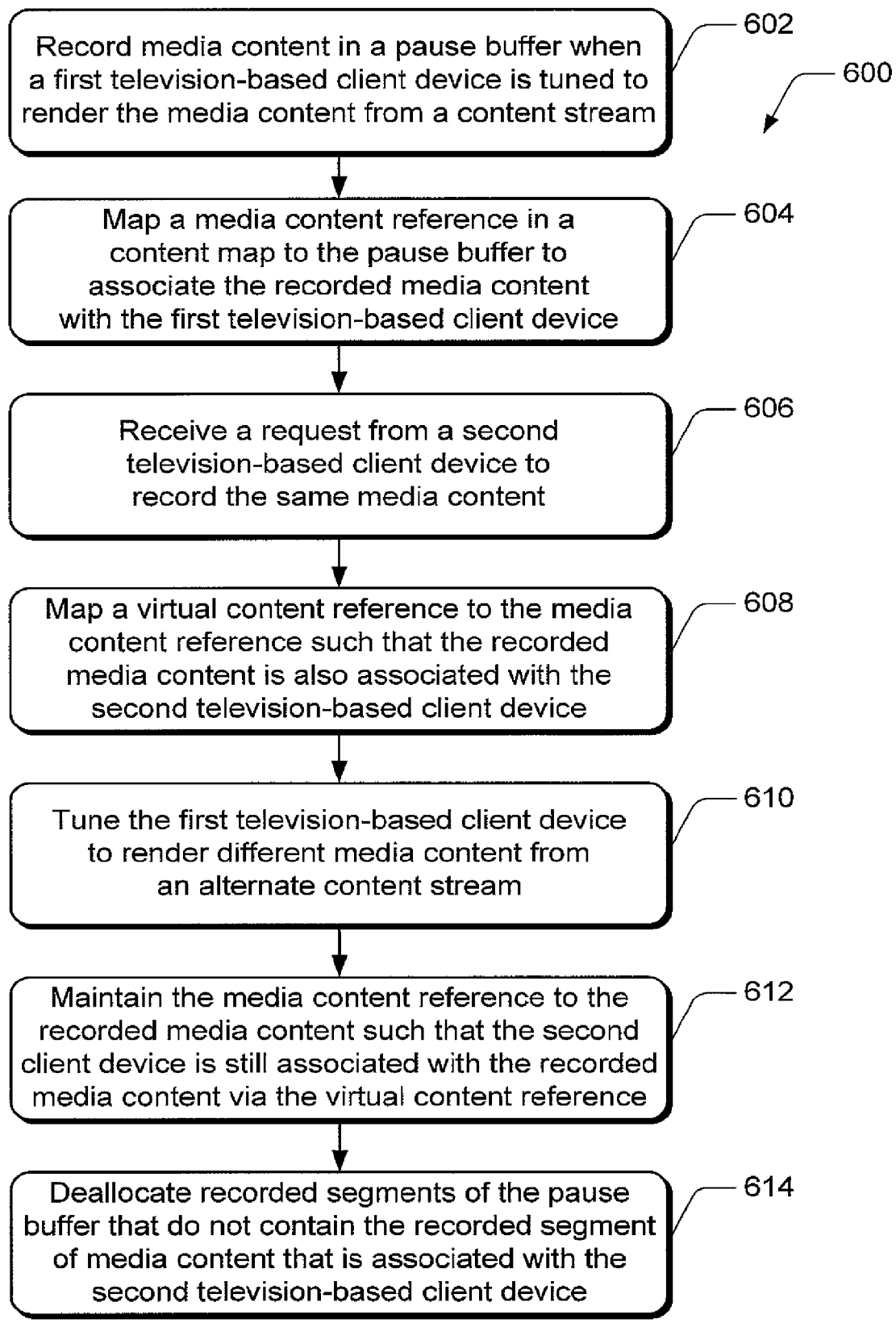
FIG. 6 illustrates exemplary method(s) for multi-DVR content management.

FIG. 6 illustrates an exemplary method 600 for multi-DVR content management and is described with reference to the exemplary environment shown in FIG. 1 and to the exemplary content mapping system shown in FIG. 2. The order in which the method is described is not intended to be construed as a limitation, and any number of the described method blocks can be combined in any order to implement the method, or an alternate method.

At block 602, media content is recorded in a pause buffer when a first television-based client device is tuned to render the media content from a content stream. For example, the multi-DVR system 102 includes DVR nodes 108(1-N) and a recording node 110 that can be implemented independently from the DVR nodes 108(1-N), or that can be implemented as at least one of the television-based client devices at a DVR node 108. Alternative to the recording node 110, the multi-DVR system 102 communicates with recording node 118 which is a network-based service that records media content for any one or more of the television-based client devices at the respective DVR nodes 108(1-N) of the multi-DVR system 102. A recording node 110, 118 records media content in a pause buffer with the respective recording media 116, 122 when a first television-based client device at DVR node 108(1) is tuned to render media content from a content stream.

At block 604, a media content reference in a content map is mapped to the pause buffer to associate the recorded media content with the first television-based client device. For example, media content reference 212(1) is generated in the content map 202 to reference the recorded media content at the allocated memory segments 208(0-3) in the pause buffer (e.g., recording media 204), and to associate the first television-based client device with the recorded media content. The media content reference 212(1) can include the reference metadata 218 which includes a time-based index to a segment of the recorded media content.

At block 606, a request is received from a second television-based client device to record the same media content. For example, a second television-based client device at DVR node 108(2) requests that the recording node 110 record the same media content, or a segment thereof, that is being received by the first television-based client device at DVR node 108(1) of the multi-DVR system 102, and which the recording node 110 is already recording in a pause buffer.

At block 608, a virtual content reference is mapped to the media content reference such that the recorded media content is also associated with the second television-based client device. For example, a virtual content reference 214 is generated which is a reference to the media content reference 212(1) such that second television-based client device is also associated with the recorded media content via the media content reference 212(1).

At block 610, the first television-based client device is tuned to render different media content from an alternate content stream. At block 612, the media content reference in the content map to the recorded segment of the media content is maintained such that the second television-based client device is still associated with the recorded segment of the media content via the virtual content reference. For example, the recording node 110 maintains the recording of the pause buffer when the first television-based client device at DVR node 108(1) tunes to an alternate content stream such that the second television-based client device at DVR node 108(2) can still access the recorded media content via the media content reference 212(1) from the virtual content reference 214.

At block 614, recorded segments of the pause buffer are deallocated that do not contain the recorded segment of the media content which is associated with the second television-based client device. For example, in an event that the second television-based client device only initiated a recording of a portion or segment of the recorded media content in the pause buffer, then the other recorded segments of the pause buffer that are not referenced from the content map are deallocated for future recordings.

Figure 7:
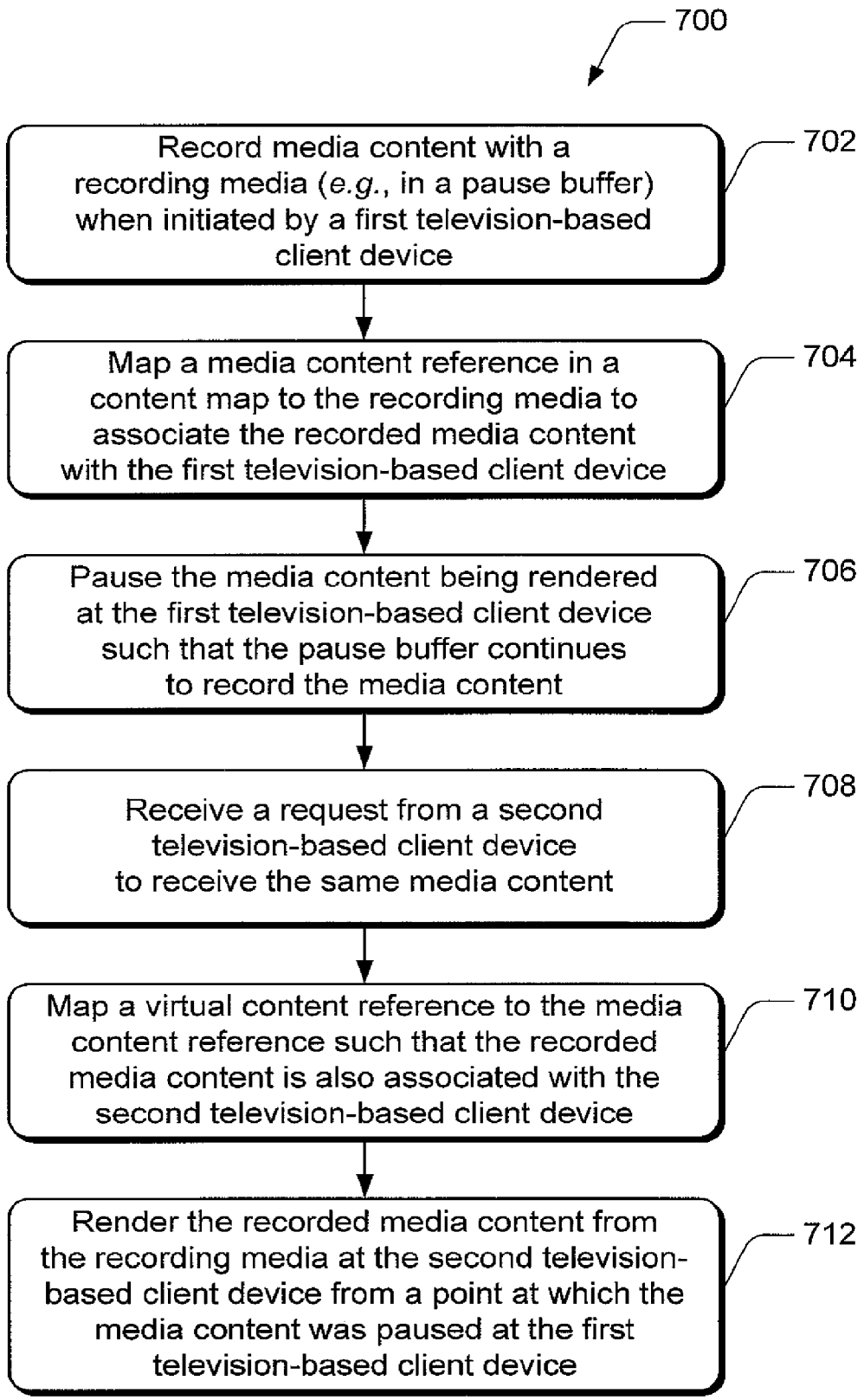
FIG. 7 illustrates exemplary method(s) for multi-DVR content management.

FIG. 7 illustrates an exemplary method 700 for multi-DVR content management and is described with reference to the exemplary environment shown in FIG. 1 and to the exemplary content mapping system shown in FIG. 2. The order in which the method is described is not intended to be construed as a limitation, and any number of the described method blocks can be combined in any order to implement the method, or an alternate method.

At block 702, media content is recorded with a recording media when initiated by a television-based client device. For example, the multi-DVR system 102 includes DVR nodes 108(1-N) and a recording node 110 that can be implemented independently from the DVR nodes 108(1-N), or can be implemented as at least one of the television-based client devices at a DVR node 108. Alternative to the recording node 110, the multi-DVR system 102 communicates with recording node 118 which is a network-based service that records media content for one or more of the television-based client devices at the respective DVR nodes 108(1-N) of the multi-DVR system 102. A recording node 110, 118 records media content (such as in a pause buffer) with the respective recording media 116, 122 when initiated by a first television-based client device at DVR node 108(1).

At block 704, a media content reference in a content map is mapped to the recording media to associate the recorded media content with the television-based client device. For example, media content reference 212(1) is generated in the content map 202 to reference the recorded media content at the allocated memory segments 208(0-3) in the recording media 204, and to associate the first television-based client device with the recorded media content.

At block 706, the media content being rendered at the first television-based client device is paused such that the pause buffer continues to record the media content. At block 708, a request is received from a different television-based client device to receive the same media content. For example, a viewer in a downstairs room of a household that includes the multi-DVR system 102 may pause the first television-based client device at DVR node 108(1), and then go upstairs to continue viewing the media content in a different room where the second television-based client device at DVR node 108(2) is located.

At block 710, a virtual content reference is mapped to the media content reference such that the recorded media content is also associated with the second television-based client device. For example, a virtual content reference 214 is generated which is a reference to the media content reference 212(1) such that second television-based client device is also associated with the recorded media content via the media content reference 212(1).

At block 712, the recorded media content is rendered from the recording media at the second television-based client device from a point at which the media content was paused at the first television-based client device. For example, the recorded media content maintained with recording media 204 can be rendered at the second television-based client device at the DVR node 108(2) without discontinuity of the media content.

Figure 8:
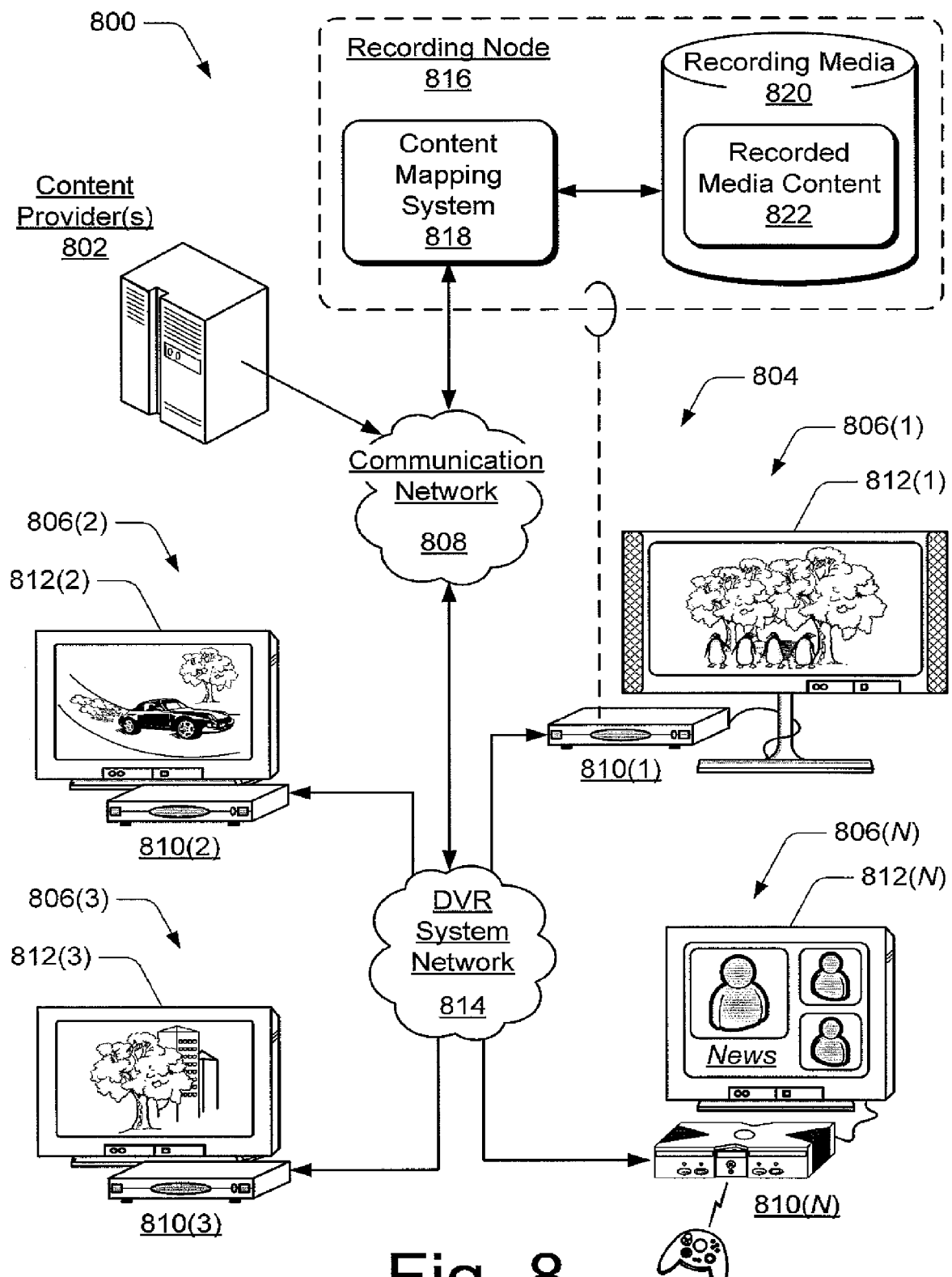
FIG. 8 illustrates an exemplary IP-based television (IPTV) system in which embodiments of multi-DVR node communication can be implemented.

FIG. 8 illustrates an exemplary IP-based television (IPTV) environment 800 in which embodiments of multi-DVR node communication can be implemented. The IPTV environment 800 includes content provider(s) 802 and a multi-DVR system 804 that can include any number of television-based client systems 806(1-N). The multi-DVR system 804 is an example of the multi-DVR system shown in FIG. 1, and can represent a household viewing system that has several viewing areas, such as different rooms, for viewing television programs. The multi-DVR system 804 is configured for communication with any number of the different content provider(s) 802 via a communication network 808 which, in this example, is an IP-based network. Any of the systems and/or devices can be configured for network access in any number of embodiments and varieties of implementation.

The television-based client systems 806(1-N) of the multi-DVR system 804 are representative of the DVR nodes 108(1-N) of the multi-DVR system shown in FIG. 1. The television-based client system 806(1) includes a television-based client device 810(1) and a display device 812(1), such as any type of television, monitor, LCD, or similar television-based display system that together renders audio, video, and/or image data. Similarly, the television-based client systems 806(2-N) each include a respective television-based client device 810(2-N) and a respective display device 812(2-N). Each television-based client device 810 can be implemented in any number of embodiments, such as a television-based set-top box, a digital video recorder (DVR) and playback system, an appliance device, a gaming system such as client device 810(N), and as any other type of client device that may be implemented in a television-based entertainment and information system.

The television-based client systems 806(1-N) can be implemented for communication with each other via a DVR system network 814, and may be implemented with any number and combination of differing components as further described below with reference to the exemplary client device shown in FIG. 9. Further, the IPTV environment 800 may be implemented with any number and combination of differing components as described below with reference to the exemplary entertainment and information system shown in FIG. 10.

A television-based client system 806 at a node of the multi-DVR system 804 can receive programs, associated program content, various forms of media content, program guide data, advertising content, and other types of media content from content server(s) of the content provider(s) 802 via the communication network 808. Media content can include television-based programs (or programming) which may be any form of programs, commercials, music, movies, and video on-demand movies. Other media content can include recorded media content, interactive games, network-based applications, and any other similar audio, video, and/or image content. In addition, media content in general may include music streamed from a computing device to a client device, such as a television-based set-top box, and may also include video on-demand media content delivered from a server, a photo slideshow, and any other audio, video, and/or image content received from any type of media content source.

Although the data streams are not shown specifically, the arrowed communication links illustrate various data communication links which include the data streams. Additionally, the arrowed communication links are not intended to be interpreted as a one-way communication link from the DVR system network 814 to a client device 810(1), for example. It is contemplated that any one or more of the arrowed communication links can facilitate two-way data communication, such as from communication network 808 to a content provider 802.

The multi-DVR system 804 includes a recording node 816 which includes a content mapping system 818 and recording media 820 to maintain recorded media 822. In an embodiment, any one or more of the television-based client devices 810(1-N) in the multi-DVR system 804 can be implemented as the recording node 816 (as shown by the dashed line) which includes the recording media 820 to record media content received from a content provider 802. Alternatively (or in addition), a recording node of the multi-DVR system 804 can be implemented as a network-based recording node that the multi-DVR system 804 can communicate with via the communication network 808. In another implementation, the recording node 816 can be an independent component of the multi-DVR system 804.

The recording node 816 can record media content with the recording media 820 for any one or more of the television-based client devices 810(1-N) of the multi-DVR system 804. For example, a television-based client device 810 can initiate a record request to have media content recorded for a scheduled recording or to record and provide a pause buffer for the television-based client device. The recording node 816 can receive the record request and record the media content such that the television-based client device can access and render the recorded media content from the recording node via the DVR system network 814 and/or the communication network 808.

Figure 9:
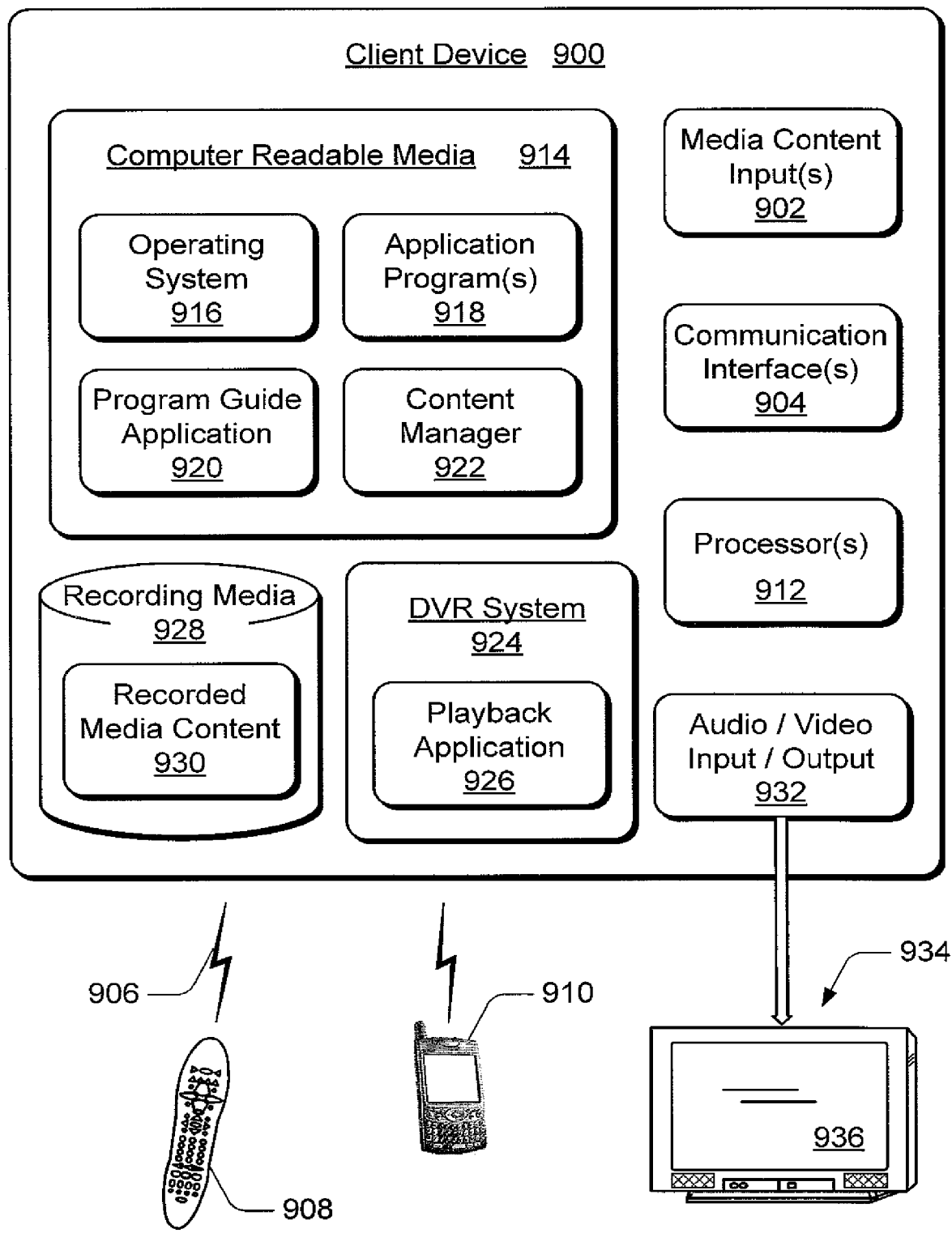
FIG. 9 illustrates various components of an exemplary client device in which embodiments of multi-DVR node communication can be implemented.

FIG. 9 illustrates various components of an exemplary client device 900 which can be implemented as any form of a computing, electronic, or television-based client device in which embodiments of multi-DVR node communication can be implemented. For example, the client device 900 can be implemented as a television-based client device at a DVR node of the multi-DVR system shown in FIG. 1, and/or as any one of the television-based client devices 810(1-N) shown in FIG. 8 as part of the multi-DVR system 804.

Client device 900 includes one or more media content inputs 902 which may include Internet Protocol (IP) inputs over which streams of media content are received via an IP-based network. Device 900 further includes communication interface(s) 904 which can be implemented as any one or more of a serial and/or parallel interface, a wireless interface, any type of network interface, a modem, and as any other type of communication interface. A wireless interface enables client device 900 to receive control input commands 906 and other information from an input device, such as from remote control device 908, a portable computing-based device (such as a cellular phone) 910, or from another infrared (IR), 802.11, Bluetooth, or similar RF input device.

A network interface provides a connection between the client device 900 and a communication network by which other electronic and computing devices can communicate data with device 900. Similarly, a serial and/or parallel interface provides for data communication directly between client device 900 and the other electronic or computing devices. A modem facilitates client device 900 communication with other electronic and computing devices via a conventional telephone line, a DSL connection, cable, and/or other type of connection.

Client device 900 also includes one or more processors 912 (e.g., any of microprocessors, controllers, and the like) which process various computer executable instructions to control the operation of device 900, to communicate with other electronic and computing devices, and to implement embodiments of multi-DVR node communication. Client device 900 can be implemented with computer readable media 914, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 914 provides data storage mechanisms to store various information and/or data such as software applications and any other types of information and data related to operational aspects of client device 900. For example, an operating system 916 and/or other application programs 918 can be maintained as software applications with the computer readable media 914 and executed on processor(s) 912 to implement embodiments of multi-DVR node communication.

For example, client device 900 can be implemented to include a program guide application 920 that is implemented to process program guide data and generate program guides for display which enable a viewer to navigate through an onscreen display and locate broadcast programs, recorded programs, video on-demand programs and movies, interactive game selections, network-based applications, and other media access information or content of interest to the viewer. The client device 900 can also be implemented to include a content manager 922 that is implemented to manage a content mapping system, deallocate segments of a recording media that are not referenced from a content map, and to otherwise implement embodiments of multi-DVR node communication.

The client device 900 can also include a DVR system 924 with playback application 926, and recording media 928 to maintain recorded media content 930 which may be any form of on-demand and/or media content such as programs, movies, commercials, music, and similar audio, video, and/or image content that client device 900 receives and/or records. Further, client device 900 may access or receive additional recorded media content that is maintained with a remote data store (not shown), such as from a video-on-demand server, or media content that is maintained at a broadcast center or content provider that distributes the media content to subscriber sites and client devices. The playback application 926 is a video control application that can be implemented to control the playback of media content, the recorded media content 930, and or other video on-demand media content, music, and any other audio, video, and/or image media content which can be rendered and/or displayed for viewing.

The client device 900 also includes an audio and/or video output 932 that provides audio and video to an audio rendering and/or display system 934, or to other devices that process, display, and/or otherwise render audio, video, and image data. Video signals and audio signals can be communicated from device 900 to a display device 936 via an RF (radio frequency) link, S-video link, composite video link, component video link, analog audio connection, or other similar communication link. Alternatively, the audio rendering and/or display system 934 is/are integrated components of the exemplary client device 900.

Figure 10:
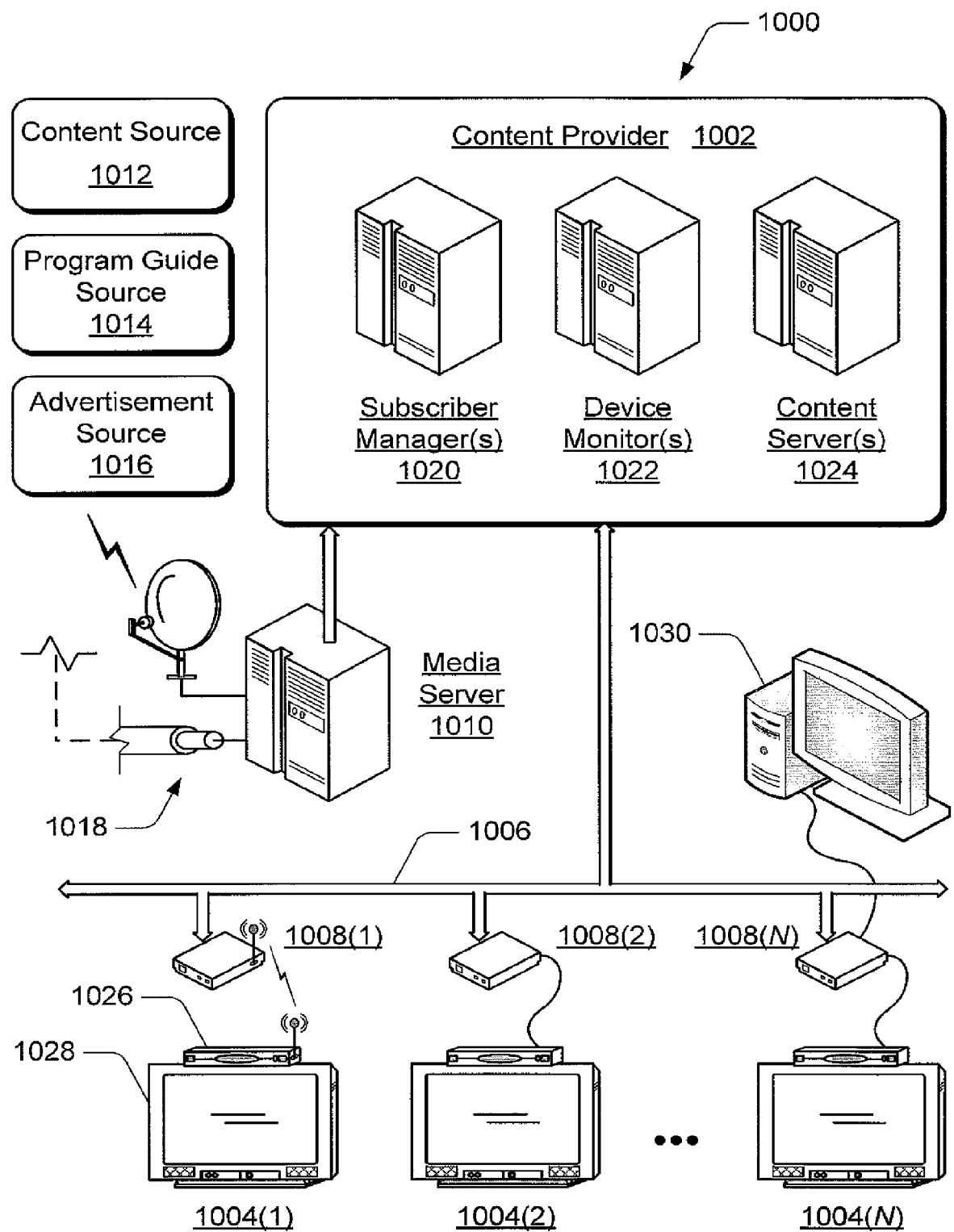
FIG. 10 illustrates various devices and components in an exemplary entertainment and information system in which embodiments of multi-DVR node communication can be implemented.

FIG. 10 illustrates an exemplary entertainment and information system 1000 in which an IP-based television environment can be implemented, and in which embodiments of multi-DVR node communication can be implemented. System 1000 facilitates the distribution of media content, program guide data, and advertising content to multiple viewers and to multiple viewing systems. System 1000 includes a content provider 1002 and television-based client systems 1004(1-N) each configured for communication via an IP-based network 1006. Each television-based client system 1004(1-N) is an example of the television-based client systems 806(1-N) described with reference to FIG. 8. Each of the television-based client systems 1004(1-N) can receive one or more data streams from content provider 1002 which are then distributed to one or more other television-based client devices at DVR nodes of a multi-DVR system.

The network 1006 can be implemented as a wide area network (e.g., the Internet), an intranet, a Digital Subscriber Line (DSL) network infrastructure, or as a point-to-point coupling infrastructure. Additionally, network 1006 can be implemented using any type of network topology and any network communication protocol, and can be represented or otherwise implemented as a combination of two or more networks. A digital network can include various hardwired and/or wireless links 1008(1-N), routers, gateways, and so on to facilitate communication between content provider 1002 and the client systems 1004(1-N). The television-based client systems 1004(1-N) receive media content, program content, program guide data, advertising content, closed captions data, and the like from content server(s) of the content provider 1002 via the IP-based network 1006.

System 1000 includes a media server 1010 that receives media content from a content source 1012, program guide data from a program guide source 1014, and advertising content from an advertisement source 1016. In an embodiment, the media server 1010 represents an acquisition server that receives the audio and video media content from content source 1012, an EPG server that receives the program guide data from program guide source 1014, and/or an advertising management server that receives the advertising content from the advertisement source 1016.

The content source 1012, the program guide source 1014, and the advertisement source 1016 control distribution of the media content, the program guide data, and the advertising content to the media server 1010 and/or to other television-based servers. The media content, program guide data, and advertising content is distributed via various transmission media 1018, such as satellite transmission, radio frequency transmission, cable transmission, and/or via any number of other wired or wireless transmission media. In this example, media server 1010 is shown as an independent component of system 1000 that communicates the program content, program guide data, and advertising content to content provider 1002. In an alternate implementation, media server 1010 can be implemented as a component of content provider 1002.

Content provider 1002 is representative of a headend service in a television-based content distribution system, for example, that provides the media content, program guide data, and advertising content to multiple subscribers (e.g., the television-based client systems 1004(1-N)). The content provider 1002 can be implemented as a satellite operator, a network television operator, a cable operator, and the like to control distribution of media content, program and advertising content, such as movies, television programs, commercials, music, and other audio, video, and/or image content to the client systems 1004(1-N).

Content provider 1002 includes various components to facilitate media data processing and content distribution, such as a subscriber manager 1020, a device monitor 1022, and a content server 1024. The subscriber manager 1020 manages subscriber data, and the device monitor 1022 monitors the client systems 1004(1-N) (e.g., and the subscribers), and maintains monitored client state information.

Although the various managers, servers, and monitors of content provider 1002 (to include the media server 1010 in one embodiment) are illustrated and described as distributed, independent components of content provider 1002, any one or more of the managers, servers, and monitors can be implemented together as a multi-functional component of content provider 1002. Additionally, any one or more of the managers, servers, and monitors described with reference to system 1000 can implement features and embodiments of multi-DVR node communication.

The television-based client systems 1004(1-N) can be implemented to include a television-based client device 1026 and a display device 1028 (e.g., a television, LCD, and the like). A television-based client device 1026 of a television-based client system 1004 can be implemented in any number of embodiments, such as a set-top box, a digital video recorder (DVR) and playback system, an appliance device, a gaming system, and as any other type of client device that may be implemented in a television-based entertainment and information system. In an alternate embodiment, client system 1004(N) is implemented with a computing device 1030 as well as a television-based client device 1026. Additionally, any of the television-based client devices 1026 of a television-based client system 1004 can implement features and embodiments of multi-DVR node communication as described herein.

Although embodiments of multi-DVR node communication have been described in language specific to features and/or methods, it is to be understood that the subject of the appended claims is not necessarily limited to the specific features or methods described. Rather, the specific features and methods are disclosed as exemplary implementations of multi-DVR node communication.

The invention claimed is:

1. A method, comprising:
communicating a node status from television-based client devices that are each nodes of a multi-DVR system to other television-based client devices that are each nodes of the multi-DVR system, wherein:
each node of the multi-DVR system is configured to communicate its node status to all other nodes of the multi-DVR system,
node status comprises at least a media content identifier of media content being rendered at a television-based client device, each of the television-based client devices comprises recording capabilities for recording media content,
each node of the multi-DVR system is configured to make decisions on behalf of other nodes of the multi-DVR system based on the node statuses which have been received from the other nodes, and a recording node generates a content reference and a virtual content reference in a content map for the multi-DVR system, wherein the content reference references media content recorded for a first television-based client device, and a virtual content reference references the same media content recorded for the first television-based client device responsive to a record request received from a second television-based client device; and
receiving node status updates from each of the television-based client devices that are the nodes of the multi-DVR system such that the second television-based client device requests to playback the media content.

2. A method as recited in claim 1, further comprising recording a pause buffer for the first television-based client device at the recording node of the multi-DVR system such that one or more of the television-based client devices can request to playback the media content from the pause buffer.

3. A method as recited in claim 2, wherein the recording node of the multi-DVR system records the pause buffer for the first television-based client device at the recording node of the multi-DVR system while the television-based client device is tuned to receive the media content.

4. A method as recited in claim 3, wherein the recording node is a network based service that records the media content for one or more of the television-based client devices at the respective nodes of the multi-DVR system.

5. A method, comprising:
receiving a record request to record media content from a television-based client device in a multi-DVR system of television-based client devices that are each a node of the multi-DVR system and that are each capable of recording media content;
communicating a node status from each of the television-based client devices that are each nodes of the multi-DVR system to other television-based client devices that are each nodes of the multi-DVR system, wherein:
each node of the multi-DVR system is configured to communicate its node status to all other nodes of the multi-DVR system,
each node of the multi-DVR system is configured to make decisions on behalf of other nodes based on the node statuses which have been received from the other nodes, and
each node of the multi-DVR system is configured to generate a content reference and a virtual content reference in a content map for the multi-DVR system, wherein content reference references media content recorded at the television-based client device corresponding to each node, and the virtual content reference references the same media content recorded at the television-based client device corresponding to each node responsive to a record request received from an additional television-based client device corresponding to an additional node;

determining whether the multi-DVR system has available resources to record the media content for the television-based client device, wherein the determining comprises each node of the multi-DVR system communicating with each of the other nodes of the multi-DVR system; and in an event the multi-DVR system has the available resources:
recording the media content at the television-based client device; and
generating a content reference in the content map such that the television-based client device can access and render the recorded media content.

6. A method as recited in claim 5, wherein the record request received from the television-based client device includes a media content identifier of the media content, a record start time, and a record stop time.

7. A method as recited in claim 5, further comprising receiving a playback request from the additional television-based client device at a node of the multi DVR system to receive the recorded media content such that the recorded media content is rendered at both the television-based client device and at the additional television-based client device.

8. A method as recited in claim 5, further comprising receiving a node status update from each of the television-based client devices that are the nodes of the multi-DVR system.

9. A multi-DVR system, comprising:
television-based client devices that are each a node of the multi-DVR system and are each configured to communicate a node status to each other to make decisions on behalf of other nodes of the multi-DVR system based on the node statuses which have been received from the other nodes of the multi-DVR system and to generate a plurality of content references in a content map for the multi-DVR system, wherein a content reference references recording media of one or more of the television-based client devices;

a first television-based client device configured to initiate a first record request to record media content;

a second television-based client device configured to initiate a second record request to record the same media content; and a recording node of the multi-DVR system configured to:
receive the first record request and record the media content and generate a first content reference such that the first television-based client device can access and render the recorded media content from the recording node; and
receive the second record request and generate a second content reference such that the second television-based client device can access and render the recorded media content from the recording node.

10. A multi-DVR system as recited in claim 9, wherein the first and second record requests from the first and second television-based client devices each include a media content identifier of the media content, a record start time, and a record stop time.

11. A multi-DVR system as recited in claim 9, wherein at least one of the television-based client devices is the recording node of the multi-DVR system configured to record the media content for one or more of the television-based client devices.

12. A multi-DVR system as recited in claim 9, wherein the recording node is a network based service configured to record the media content for one or more of the television-based client devices.

13. A multi-DVR system as recited in claim 9, wherein the nodes of the multi-DVR system are each configured to receive a node status update from each of the television-based client devices that are the nodes of the multi-DVR system.

14. A multi-DVR system as recited in claim 9, wherein a node status communicated from a television-based client device includes at least one of: a media content identifier of the media content; a service bit rate; a multicast indication; a unicast indication.

15. A multi-DVR system as recited in claim 9, configured to implement media stream transitions based on the content map to thereby allow a television-based client device at a node of the multi-DVR system to be transitioned from receiving media content via a broadcast content stream to receiving the media content from recording media of one of the one or more television-based client devices.

16. A multi-DVR system as recited in claim 15, configured to implement media stream transitions in response to a play command that follows a pause command.

17. A multi-DVR system as recited in claim 16, configured to, in response to the pause command, record the broadcast content to one of the one or more of television-based client devices.

18. A multi-DVR system as recited in claim 17, further configured to, in response to the pause command, generate a content reference in the content map that references the recording media of the of the one or more television-based client devices.

19. A multi-DVR system as recited in claim 9, wherein the first content reference and the second content reference comprise overlapping memory segments.

20. A multi-DVR system as recited in claim 9, wherein the second content reference comprises a virtual reference.

* * * * *